US012691591B2

(12) United States Patent
Ahn et al.

(10) Patent No.: US 12,691,591 B2
(45) Date of Patent: Jul. 28, 2026

(54) DOOR OPENING DETECTION DEVICE AND DOOR OPENING RECOGNITION SYSTEM

(71) Applicant: BEAR ROBOTICS KOREA, INC., Seoul (KR)

(72) Inventors: Changhyun Ahn, Seoul (KR); Iljae Lee, Seoul (KR); Kyoungtae Kim, Seoul (KR)

(73) Assignee: BEAR ROBOTICS KOREA, INC., Seoul (KR)

( * ) Notice: Subject to any disclaimer, the term of this patent is extended or adjusted under 35 U.S.C. 154(b) by 40 days.

(21) Appl. No.: 18/722,423

(22) PCT Filed: May 11, 2022

(86) PCT No.: PCT/KR2022/006776
§ 371 (c)(1),
(2) Date: Jun. 20, 2024

(87) PCT Pub. No.: WO2023/191180
PCT Pub. Date: Oct. 5, 2023

(65) Prior Publication Data
US 2024/0416527 A1 Dec. 19, 2024

(30) Foreign Application Priority Data
Mar. 30, 2022 (KR) ........................ 10-2022-0039902

(51) Int. Cl.
*B25J 13/00* (2006.01)
*G01D 5/00* (2006.01)
(52) U.S. Cl.
CPC .............. *B25J 13/006* (2013.01); *G01D 5/00* (2013.01)

(58) Field of Classification Search
None
See application file for complete search history.

(56) References Cited

U.S. PATENT DOCUMENTS

| | | | | |
|---|---|---|---|---|
| 5,594,316 A | * | 1/1997 | Hayashida | H02J 50/90 |
| | | | | 320/108 |
| 5,861,806 A | * | 1/1999 | Vories | G08B 5/36 |
| | | | | 340/556 |

(Continued)

*Primary Examiner* — Thomas S McCormack
(74) *Attorney, Agent, or Firm* — Birch, Stewart, Kolasch & Birch, LLP

(57) ABSTRACT

A door opening detection device and a door opening recognition system are disclosed. The door opening recognition system comprises the door opening detection device and a robot. The door opening detection device is mounted to an inside door handle, and the robot comprises a communication module and performs a predetermined operation in an internal space located inside a door in a state where the door is closed. The door opening detection device is operated in a state where, when the door is closed, a door sensing unit connected to one end of a string is located inside the door and a tag connected to the other end of the string and connected to the door sensing unit is fixed to be located outside the door. As the other end of the string and the tag are pulled in the opposite direction to the direction of gravity through a door gap when the door is opened, the door opening detection device detects that the door sensing unit has been moved in the direction of gravity, and generates a detection signal corresponding thereto. Then, the robot receives the detection signal from the door opening detection device through the communication module, and recognizes the opening of the door and stops the operation on the basis of the received detection signal.

9 Claims, 7 Drawing Sheets

(56)             References Cited

U.S. PATENT DOCUMENTS

| 9,064,394 B1 * | 6/2015 | Trundle | .......... G08B 13/19663 |
| 2016/0018560 A1 * | 1/2016 | Shimizu | .................. G01V 8/10 |
| | | | 73/488 |

* cited by examiner

DUE TO CLOSING OF DOOR, DOOR SENSING UNIT ALIGNS INWARD FROM INSIDE OF DOOR, AND POSITION OF TAG CONNECTED TO DOOR SENSING UNIT IS FIXED OUTWARD FROM OUTSIDE OF DOOR — 310

WHEN DOOR IS OPEN, MOVEMENT OF DOOR SENSING UNIT IN DIRECTION OF GRAVITY DUE TO MOVEMENT OF POSITION OF TAG IS DETECTED — 320

DOOR OPENING SIGNAL ACCORDING TO SENSING IS TRANSMITTED TO OUTSIDE — 330

300

DOOR OPENING DETECTION DEVICE AND DOOR OPENING RECOGNITION SYSTEM

CROSS REFERENCE TO RELATED APPLICATIONS

This application is the National Phase of PCT/KR2022/006776 filed on May 11, 2022, which claims priority under 35 U.S.C. § 119 (a) to Patent Application No. 10-2022-0039902 filed in the Republic of Korea on Mar. 30, 2022, all of which are hereby expressly incorporated by reference into the present application.

TECHNICAL FIELD

The present disclosure relates to a door opening detection device and a door opening recognition system and, more specifically, to a door opening detection device configured to be mounted to a handle of a door and a door opening recognition system capable of notifying a robot, which currently performs a task, of opening of a door, using the door opening detection device.

BACKGROUND ART

For the purpose of safety and entrance and exit restriction, there are cases where there is a need to detect that a door is open. Accordingly, the opening and closing of the door can be detected by attaching a separate sensor to the door or installing a door lock on the door.

Normally, an acceleration sensor or a gyro sensor is used as a sensor for detecting the opening and closing of the door. A change in acceleration occurs while the door is open or closed. The acceleration sensor or the gyro sensor recognizes the opening or closing of the door by measuring a change in a value of acceleration or gyration that occurs when the door is open or closed.

The value of acceleration or gyration that occurs when the door is open or closed may vary according to shapes of doors, types of doors, and method of opening and closing doors. Specifically, in the case of a manual door, the value of acceleration or gyration varies according to a size of the manual door, the magnitude of force applied by a person who opens the manual door, or a method of opening the manual door. In addition, in the case of an automatic door, the value of acceleration or gyration always varies, without any restrictions, according to types or shapes of drive motors, gears, and axes. In any case, the value of acceleration or gyration becomes 0 while (during a time period for which) a door is open at an equal speed. In this case, it is difficult to quickly and precisely estimate the operation of opening the door.

In addition, a method of opening the door may vary widely. Therefore, the value of acceleration or gyration is sensed, depending on only the operation of opening the door, thereby estimating the opening of the door. However, this estimation causes the problem of limiting the extensibility of application.

Moreover, a sensor for detecting the opening and closing the door may be attached to the door or installed on a door lock or the like. However, these methods require that a sensor or device be provided on a per-door basis or on the basis of a predetermined range of regions. This approach causes the problems of installation inconvenience and insufficient usage flexibility.

DISCLOSURE OF INVENTION

Technical Problem

Objects of the present disclosure is to address the above-mentioned problems and other problems.

One object of an embodiment of the present disclosure is to provide a door opening detection device and a door opening recognition system that are capable of quickly and precisely detecting an open state of a door using only a mountable handle regardless of a type of the door or a method of opening and closing the door.

Another object of the embodiment of the present disclosure is to provide a door opening detection device and a door opening recognition system that are capable of minimizing a sensing failure rate without being affected by characteristics of a person who opens a door, by detecting an open state itself of the door regardless of an opening speed of the door.

Still another object of the embodiment of the present disclosure is to provide a door opening detection device and a door opening recognition system that are capable of being moved and mounted in accordance with a change in a location where a task is to be performed, without being installed or mounted in a separate manner.

Yet another object of the embodiment of the present disclosure is to provide a door opening detection device and a door opening recognition system that are capable of notifying the outside of the purpose for restricting entrance and exit and immediately notifying an operator (a "robot" or the like) inward from the inside of a door that the door is open, but making it difficult for an outsider to arbitrarily remove the purpose.

Solution to Problem

A door opening detection device according to an embodiment of the present disclosure notifies the outside that a task is currently performed in an internal space, through a tag that is exposed outward from the outside of a door, and immediately senses falling movement of a door sensor in the opposite direction to a direction in which the exposed tag moves, when the door is open.

For this purpose, the door opening detection device according to the embodiment of the present disclosure is mounted to a handle of a door. The door opening detection device operates in a state where, when the door is closed, a door sensing unit is fixed inward from the inside of the door and a tag is fixed outward from the outside of the door. When the door is open in this state, a gap between the door and the door frame occurs. Thus, the tag that is no longer fixed moves, the door sensing unit connected to the tag moves in the direction of gravity, thereby detecting the movement. By detecting this movement, the door sensing unit recognizes the opening of the door and emits a signal corresponding to the opening of the door. Accordingly, regardless of an opening speed of the door or the degree of the opening of the door, only when the door is open, the opening of the door can be precisely detected.

Specifically, according to one aspect of the present disclosure, there is provided a door opening detection device including: a mark unit having a first portion and a second portion, the first portion being formed in such a manner as to be mountable on a handle of a door, the second portion extending from the first portion, and at least one hole being formed in the second portion; a connection unit configured in the shape of a string, the connection unit passing through the hole in the mark unit, and both ends of the string being arranged to face in the direction of gravity; a door sensing unit connected to one end portion of the connection unit and configured to sense a value of movement in the direction of gravity when the door is open; and a tag connected to the other portion of the connection unit, the tag and the door sensing unit being connected to each other through the connection unit. In the door opening detection device, the door sensing unit aligns inward from the inside of the door, together with the mark unit, when the door is closed, detects the movement in the direction of gravity according to movement of a position of the tag that results when the door is open, in a state where the tag is fixed in such a manner as to be positioned outward from the outside of the door, and outputs a signal that results from detecting the opening of the door.

In the door opening detection device, the tag may be formed in a thin long shape in such a manner that a sign thereof is exposed outward from the outside of the door while the door is closed and that the movement of the position thereof is possible due to a gap that occurs when the door is open.

In the door opening detection device, the door sensing unit, connected to one end portion of the connection unit, may detect a value of falling movement in the direction of gravity that is as great a distance as the position of the tag, connected to the other end portion of the connection unit, moves toward the hole along the gap when the door is open.

In the door opening detection device, at least a plurality of holes may be arranged to be spaced a predetermined separation distance apart in parallel in the upward-downward direction, in the second portion of the mark unit. In the door opening detection device, one end portion of the connection unit may be connected to the door sensing unit in a state of sequentially passing through the plurality of holes in the direction from upward to downward, and the other end portion of the connection unit may be connected to the tag in a state of passing through only one of the plurality of holes.

In the door opening detection device, the string of the connection may be configured to have a structure with at least two cords, and the thickness of the string may have a lower value than the radius of the hole.

In the door opening detection device, the door sensing unit, connected to one end portion of the connection unit, may be pulled in the opposite direction to gravity as great a distance as the tag, connected to the other end portion of the connection unit, is pulled, the position of the tag and a position of the door sensing unit may be fixed by the closing of the door, and the fixed position of the door sensing unit may be set as a reference position for detecting the movement in the direction of gravity.

In the door opening detection device, the movement of the door sensing unit may be on the basis of the movement of the tag connected through the connection unit, and, when the door is open, the door sensing unit may detect a value of falling movement in the direction of gravity from the set reference position on the basis of the movement of the tag, which results from being no longer fixed, and may generate a signal corresponding to the detected movement.

In the door opening detection device, the generated signal may be transmitted to an external device that is present within a short-range communication range.

According to another aspect of the present disclosure, there is provided a door opening recognition system including: a door opening detection device mounted to a handle of a door, which is positioned inward from the inside of the door; a communication module; and a robot configured to perform a given task in an internal space positioned inward from the inside of the door in a state where the door is closed. In the door opening recognition system, in a state where, when the door is closed, a door sensing unit, connected to one end portion of a string, is positioned inward from the inside of the door and a tag, connected to the other portion of the string, the tag and the door sensing unit being connected to each other, is fixed in such a manner as to be positioned outward from the outside of the door, the door opening detection device detects movement of the door sensing unit in the direction of gravity according to movement of a position of the tag that results when the door is open, and generates a corresponding detection signal. Furthermore, the robot receives the detection signal from the door opening detection device through the communication module, recognizes opening of the door on the basis of the received detection signal, and interrupts the given task.

In the door opening recognition system, the communication module may receive the detection signal in compliance with a short-distance wireless communication scheme.

In the door opening recognition system, in response to the reception of the detection signal, the robot may transmit a door opening notification event to a preset terminal through the communication module.

In the door opening recognition system, the robot may receive an operation command, corresponding to the door opening notification event, from the terminal through the communication module and may perform a corresponding operation in accordance with the received operation command.

The range of possible additional applications of the present disclosure is apparent from the following detailed description. However, various modifications and alterations to the present disclosure within the scope of its technical idea would be clearly understandable to a person of ordinary skill in the art. Therefore, it should be noted that the detailed description and specific embodiments, such as preferred embodiments of the present disclosure, are provided in an exemplary manner.

Advantageous Effects of Invention

The door opening detection device and the door opening recognition system according to the present disclosure possibly find application in various shapes of doors and method of opening and closing doors and can detect an open state of a door in a fast and precise manner regardless of an opening speed of the door.

In addition, the door opening detection device and the door opening recognition system according to the present disclosure do not need to be installed in a separate manner, and can be easily moved and mounted in accordance with a change in a location where a task is to be performed.

In addition, the door opening detection device and the door opening recognition system according to the present disclosure can display various purposes for restricting entrance and exit for viewing from the outside. This prevents arbitrary removal by burglars, thereby addressing the difficulty in sensing.

In addition, the door opening detection device and the door opening recognition system according to the present disclosure can perform sensing at the same time as the door is open. This allows a robot or the like, which currently performs a task inward from the inside of the door, to be immediately notified that the door is open. Accordingly, there can be provided an advantage in that the robot or the like that currently performs a task takes prompt action.

MODE FOR THE INVENTION

Figure 1:
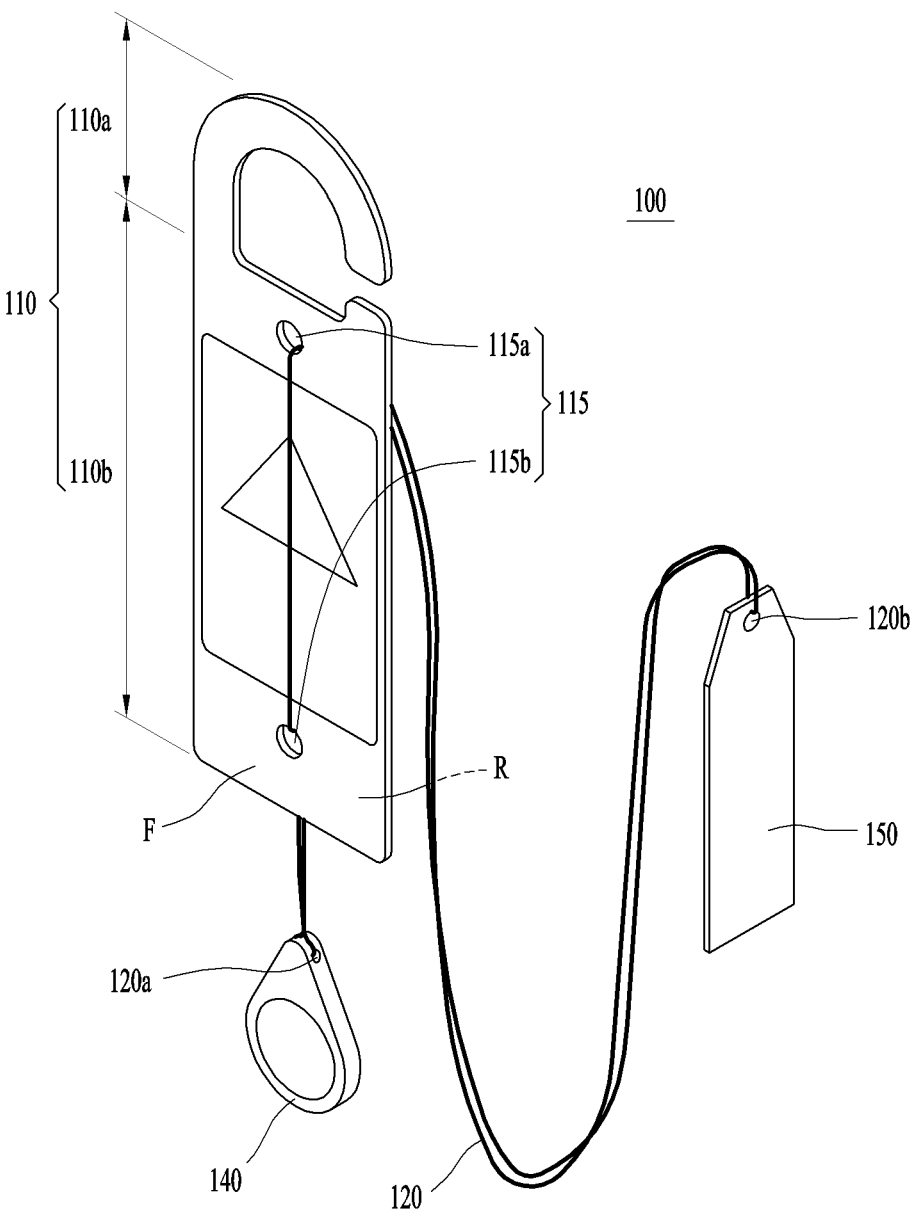
FIG. 1 is a view illustrating a door opening detection device according to the present disclosure.

Hereinafter, embodiments disclosed herein will be described in detail with reference to the accompanying drawings, and the same or similar elements are designated with the same numeral references, regardless of the numerals in the drawings, and their redundant description will be omitted. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A "door opening detection device" disclosed in the present refers to a device or an instrument that is realized in a form of being mountable to a handle of a door and is configured to operate in a state where the door is open and thus to detect opening of the door. There are no limitations on a type and characteristic of the door and on a method of closing and opening the door. The handles may include all types of doorknobs and handles which the device or instrument, as in the case of a necklace, can be hung on or mounted to.

In addition, a "door opening recognition system" disclosed in the present disclosure may be used to refer to a system, an operating method, or a program that enables a robot or the like, which is set to perform a given task within a predetermined space, to interact with the door opening detection device, or to perform a responsive operation on the basis of a signal received from the door opening detection device.

In addition, the term "robot" or "robot or the like" used in the present disclosure may refer to all types of robots (including AI apparatuses) that are capable of given tasks (for example, cleaning, sanitizing, and the like) within various spaces, such as accommodations, including condominiums and hotels, and cultural spaces, including art museums and libraries, and are capable of performing autonomous traveling by themselves.

In the present disclosure, the door opening detection device is described below that is capable of quickly and precisely detecting an open state of the door regardless of a type of the door or a method of opening and closing the door and without being affected by characteristics of a person that opens the door.

FIG. 1 is a view illustrating a door opening detection device 100 according to the present disclosure.

In FIG. 1, the door opening detection device 100 is configured to include a mark unit 110, a door sensing unit 140, a tag 150, and a connection unit 120 connecting these constituent elements.

The mark unit 110 has a first portion 110a positioned in the upper section and a second portion 110b positioned in the lower section. The first portion 110a is formed to be mountable to the handle of the door. The second portion 110b is formed to integrally extend from the lower end of the first portion 110a. The mark unit 110 may be formed of one of PVC, ceramic, and acrylic materials.

The first portion 110a corresponds to a portion of the mark unit 110 that can be hung on the handle of the door in a mounted manner. The first portion 110a of the mark unit 110 may have the same shape as or a similar shape to a hooking portion of a clothes hanger in such a manner as to be hung on the handle, having any shape, of the door. Accordingly, even in a case where the handle rotates to open and close the door or where the door moves, the mark unit 110 of the door opening detection device 100 does not slide.

The first portion 110a is formed to have an opening inside the frame thereof in such a manner as to be insertable inward from the handle or doorknob of the door in a fitted manner. The first portion 110a may employ a non-open (closed loop) structure in the shape of the letter "o." Alternatively, as illustrated in FIG. 1, one side of the first portion 110a may selectively employ an open structure in the shape of the letter "c." Accordingly, the mounting or dismounting on or from the handle or knob of the door may take place without any trapping.

The second portion 110b may connect from the first portion 110a in the vertical length direction and may perform a supporting function and a signing function. The second portion 110b may include at least one hole 115 that is drilled in such a manner that a string of the connection unit 120 passes therethrough.

In an embodiment, the second portion 110b may include a plurality of drilled holes, namely, holes 115a and 115b. In this case, the plurality of drilled holes, namely, the holes 115a and 115b, are arranged to be spaced a predetermined separation distance apart in parallel in the upward-downward direction. The string of the connection unit 120 is realized to sequentially pass through the plurality of drilled holes, namely, the holes 115a and 115b, in the direction from upward to downward (or the direction from downward to upward). Thus, the positioning of the mark unit 110 may align in the direction of gravity. In addition, although the door moves, this structure can enable the mark unit 110 and the door sensing unit 140 to maintain their respective aligning states without rotating on their own axes.

Specific information in a text or image form, for example, information on a method of operating the door opening detection device 100 may be included in the second portion 110b. In this case, the second portion 110b may be covered with a film unit (not illustrated) for protecting the display of specific information. Additional information may be additionally displayed on top of the film unit using a pen.

The connection unit 120 is formed in the shape of a string that spans a long distance. The connection unit 120 may be made from all types of strings, for example, a cord, a wire, a strap, and the like, that are suitable for passing through the hole 115 and for moving when pulled.

The connection unit 120 is realized in such a manner that both ends of the string, passing through the hole 115 formed in the mark unit 110, face in the direction of gravity. With this realization, when one end of the string, passing through the hole 115, is pulled in the direction of gravity or in the direction of moving away from the hole 115, the other end thereof is raised up toward the hole 115 in the direction opposite to the gravitational direction.

Both end portions 120a and 120b of the connection unit 120, as illustrated, are connected to the door sensing unit 140 and the tag 150, respectively. For example, one end portion 120a of the connection unit 120 may be connected to the door sensing unit 140, and the other end portion 120b of the connection unit 120 may be connected to the tag 150.

In the embodiment, one end portion 120a of the connection unit 120 may sequentially pass through the first hole 115a and the second hole 115b in the mark unit 110 and may be coupled to the door sensing unit 140.

At this point, one end portion 120a of the connection unit 120 may be coupled to the door sensing unit 140 in a way that passes through the first hole 115a in the direction from a rear surface R of the mark unit 110 to a front surface F thereof, then runs along a front surface F of the second portion 110b and passes through the second hole 115b in the direction toward the rear surface R (FIG. 1). In addition, conversely, one end portion 120a of the connection unit 120 may also be connected to the door sensing unit 140 in a way that passes through the first hole 115a in the direction from a front surface F of the mark unit 110 to the rear surface R, then runs along the rear surface R of the second portion 110b and passes through the second hole 115b.

In the embodiment, the other end portion 120b of the connection unit 120 may pass through only the first hole 115a in the mark unit 110 and then may be coupled to the tag 150.

According to an embodiment, one end portion 120a and the other end portion 120b of the connection unit 120 may be formed in a predetermined shape (for example, in the shape of a bump for preventing slipping) in such a manner that both ends of the string are prevented from slipping from the door sensing unit 140 and the tag 150, respectively, or may be connected, through a prescribed coupling means, to the door sensing unit 140 and the tag 150, respectively. Alternatively, one end portion 120a and the other end portion 120b may pass through perforation portions (or holes), respectively, formed in the door sensing unit 140 and the tag 150, and then may be tied for coupling to the door sensing unit 140 and the tag 150, respectively.

The door sensing unit 140 is coupled to one end portion 120a of the connection unit 120. When operating, the door sensing unit 140 detects a value of movement in the direction of gravity and thus detects opening of the door. When detecting the opening of the door, the door sensing unit 140 transmits a corresponding signal to the outside.

The tag 150 is coupled to the other end portion 120b of the connection unit 120 and thus is connected to the door sensing unit 140 through the connection unit 120.

The tag 150 may be realized in a thin long shape (for example, in the shape of a rectangle) to minimize weight and enhance visibility. In this case, information (for example, text, an image, a symbol, or the like), indicating a task that is performed in the direction in which the mark unit 110 is mounted, or a state of such a task, may be displayed on at least one surface (or both surfaces) of the tag 150.

While the door is closed, the tag 150 is position-fixed in a state where a sign thereof is exposed outward from the outside (that is, in the direction opposite to the direction in which the mark unit 110 is mounted) of the door. Specifically, when the door is closed in a state where the tag 150 is exposed outward from the outside of the door, the connection unit 120 is fixed by being inserted into a gap between the door and the door flame. At this point, the fixed position of the tag 150 is a position of the tag 150 that remains after the door is closed, or is a position of the tag 150 that remains after the tag 150 is further pulled. At this point, the position of the door sensing unit 140 that remains after being pulled in the opposite direction to gravity as great a distance as the tag 150 is pulled is an initial position.

When the door is open, the position of the tag 150 moves due to the occurrence of the gap between the door and the door frame. In other words, when the door is open, the position of the tag 150 is no longer fixed. Then, the tag 150 is pulled in the opposite direction to gravity or toward the hole 115 in the mark unit 110 along the gap between the door and the door frame. The reason for this is that the door sensing unit 140, connected to one end portion 120a of the connection unit 120, weighs significantly more than the tag 150 and thus that only when the gap occurs, the tag 150 moves according to the law of gravity.

When the door is open, the tag 150 may be pulled up to the hole 115a in the mark unit 110 to a maximum extent. Due to the significant weight of the door sensing unit 140, connected to one end portion 120a of the connection unit 120, when the tag 150 is no longer fixed, the door sensing unit 140 falls in the direction of gravity. However, because the width of the tag 150 is greater than the diameter of the hole 115a, the tag 150 stops moving once it reaches at least the hole 115a.

In an embodiment, the string of the connection unit 120 may be configured to have a structure with at least two cords. Accordingly, even when one of the two cords is cut while the connection unit 120 is in operation, the other cord takes over to ensure normal operation. In addition, for facilitated movement, the string of the connection unit 120 is realized in such a manner as to have sufficient thickness to close the door and to have a lower value of the radius of the hole 115.

If the string of the connection unit 120 is too short, the distances that the tag 150 and the door sensing unit 140 move are short. Thus, a sensing error may occur. Conversely, if the string of the connection unit 120 is too long, the moving ranges and moving times of the tag 150 and the door sensing unit 140 increase. Thus, the twisting of the string may occur. For these reasons, the string of the connection unit 120 may be manufactured to an appropriate length (for example, 45 cm), taking into consideration all the following factors: twisting prevention, movement in an appropriate range of positions, and sufficient length for pulling. Selectively, the connection unit 120 may be realized to have a structure that is variable in length according to need.

The door sensing unit 140 is connected to one end portion 120a of the connection unit 120. When the door is closed, the door sensing unit 140 aligns inward from the inside of the door (or toward the direction of the inside of the door to which the mark unit 110 is mounted), together with the mark unit 110.

While the door is closed, the tag 150, connected through the connection unit 120, is fixed in such a manner as to be positioned outward from the outside of the door. In this state, when the door is open, the position of the tag 150 moves and at the same time, the door sensing unit 140 moves in the direction of gravity. The door sensing unit 140 detects this movement in the direction of gravity and outputs a signal that results from detecting the opening of the door.

At this point, the signal, as described in detail below, may be a short-distance wireless signal, for example, a Bluetooth signal. Selectively, the signals may further include an audio signal, such as sound, and a visual signal, such as light of an LED.

In addition, although not illustrated, the door opening detection device 100 according to the present disclosure may further include a communication module capable of receiving a response signal from an external device that receives the signal. In this case, the door opening detection device 100 according to the present disclosure may perform an operation, corresponding to the response signal received from the external device, for example, an operation of an output unit (for example, a speaker).

Various embodiments described below may be realized on a computer-readable medium or a medium readable by similar apparatuses, using, for example, software, hardware, or a combination of both.

Figure 2:
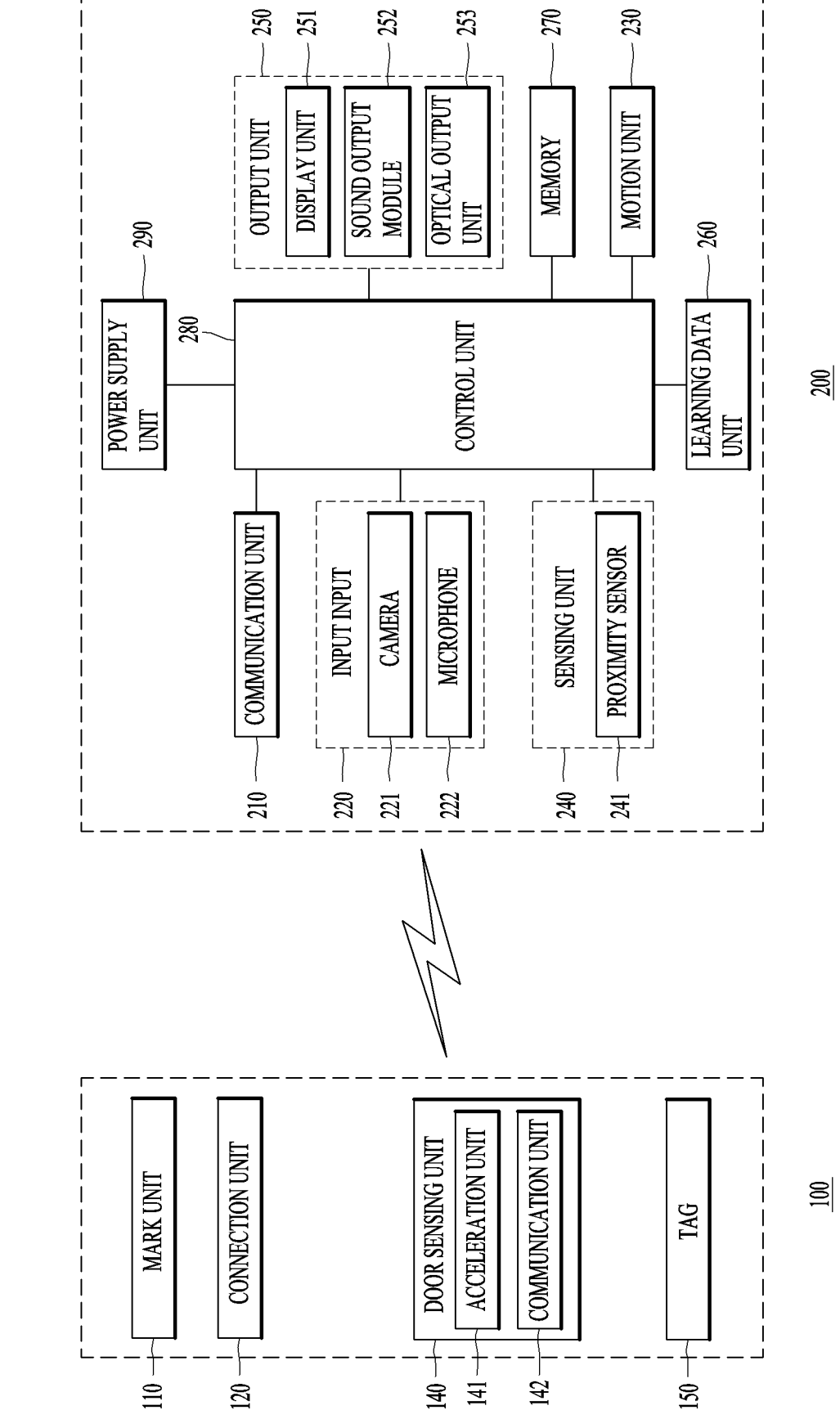
FIG. 2 is an exemplary block diagram that is referenced to describe constituent elements of the door opening detection device according to the present disclosure and constituent elements of a robot communicating with the door opening detection device.

FIG. 2 is an exemplary block diagram that is referenced to describe constituent elements of the door opening detection device 100 according to the present disclosure and constituent elements of a robot 200 communicating with the door opening detection device 100.

The door opening detection device 100 may be realized to include the mark unit 110, the connection unit 120, the door sensing unit 140, and the tag 150. These constituent elements have the structures described with reference to FIG. 1 and perform the functions and operations also described with reference to FIG. 1.

The door sensing unit 140 of the door opening detection device 100 may include an acceleration sensor 141 and a communication module 142.

The acceleration sensor 141 senses a value of movement in the direction of gravity and thus detects the opening of the door. Typically, the acceleration sensor 141 may detect a change in acceleration in three-axes directions. In the present disclosure, the door sensing unit 140, including the acceleration sensor 141 to precisely detect movement of the door, that is, the opening of the door, is realized to move in the direction of gravity. Thus, the door sensing unit 140 senses a value of falling movement in the direction of gravity. Therefore, regardless of an opening speed of the door or the technique of opening the door, the change in acceleration in the direction of gravity can be precisely sensed through the acceleration sensor 141.

The communication module 142 transmits to the outside a signal corresponding to the value detected by the acceleration sensor 141. The communication module 142 emits to the outside an electric signal that results from converting the value of the movement, which is detected by the acceleration sensor 141. According to an embodiment, the acceleration sensor 141 and the communication module 142 may be realized to be integrally combined into a single unit.

The position of the tag 140 connected to the other end portion of the connection unit 120 moves toward the hole in the mark unit 110 along the gap that occurs when the door is open. The door sensing unit 140 connected to one end portion of the connection unit 120 senses a value of falling movement in the direction of gravity, this falling movement being equal to the movement of the position of the tag 140.

For this purpose, the mark unit 110 is mounted to the doorknob (that is, the handle of the door) in the opposite direction to the direction in which the door is open. Thus, the door opening detection device 100 aligns initially, together with the door sensing unit 140, and the tag 150 maintains a position-fixed state in the direction in which the door is open.

The movement of the door sensing unit 140 is determined on the basis of the movement of the tag 150 connected through the connection unit 120.

When the door is closed (or within a predetermined time after the door is closed), the door sensing unit 140 is pulled in the opposite direction to gravity (that is, upward) as great a distance as the tag 150 is pulled. The door sensing unit 140 stores a position, which results from the fixation of the position of the tag 150, as an initial value for movement sensing. That is, after the door is closed, the fixed position of the door sensing unit 140 is set to a reference position for detecting the movement in the direction of gravity.

When the door is open, the door sensing unit 140 senses a value of falling movement in the direction of gravity from the set reference position on the basis of the movement that results when the tag 150 is no longer fixed, and generates a BT signal corresponding to the sensed value of the movement.

Specifically, the movement for opening the door is not detected. Instead, while the other end of the fixed connection unit 120 and the tag 150 are inserted into the gap that occurs due to the opening of the door itself, the door sensing unit 140 immediately falls in the direction of gravity and detects such falling movement, which is equal to the movement of the position of the tag 140. Accordingly, the sensing is possible at the same time as the door is open. The BT signal corresponding to this sensing is generated and transferred to the communication unit 210 of the robot 200.

The robot 200 may be programmed in such a manner as to perform given tasks, for example, cleaning, sanitizing, and the like, in a predetermined space toward the direction of the inside of the door to which the mark unit 110, aligning together with the door sensing unit 140, is mounted.

The robot 200 may include a communication unit 210, an input unit 220, the motion unit 230, a sensing unit 240, an output unit 250, a memory 270, a control unit 280, a power supply unit 290, and the like. The constituent elements illustrated in FIG. 2 are not essential to realize the robot. The robot described in the present specification may further one or more constituent elements in addition to the constituent elements described above or may omit one or more constituent elements described above.

The communication unit 210 may include one or more modules that enable wireless communication between the robot 200 and an external server, for example, an artificial intelligence server or an external terminal. In addition, the communication unit 210 may include one or more modules that connect the robot 200 to one or more networks.

The communication unit 210 may perform communication with an artificial intelligence server and the like, using, for example, wireless Internet communication technologies, such as Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). In addition, the communication unit 210 may perform communication with an external terminal and the like using short-distance communication technologies, such as Bluetooth™, Radio Frequency Identification (RFID), Infrared Data Association (IrDA), Ultra-Wideband (UWB), ZigBee, and Near Field Communication (NFC).

The input unit 220 may include a camera 221 or an image input unit for inputting image signals, a sound reception unit 222, for example, a microphone, for inputting audio signals, and a user input unit (not illustrated) (for example, touch keys, push keys (mechanical keys), or the like) for inputting information from a user. Signal data, audio data, and image data, which are collected by the input unit 220, may be analyzed, and the analyzed signal data, audio data, and image data may be processed as control commands.

The motion unit 230 performs moving and rotating of the main body of the robot 200. For this purpose, the motion unit 230 may be configured to include a plurality of wheels and a drive motor. The driving of the motion unit 230 is controlled by the control unit 280 according to a received control command, and a notification may be provided through an optical output unit 253, such as an LED, after and before driving the motion unit 230.

The sensing unit 240 may include one or more sensors for sensing at least one of the following: information within the robot, surrounding environmental information of the robot, and user information. For example, the sensing unit 240 may include at least one of the following sensors: a proximity sensor 241, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, refer to the camera 121), a microphone, a battery gauge, an environment sensor (for example, a barometer, a hygrometer, a thermometer, a radiation detection sensor, a heat detection sensor, a gas detection sensor, or the like), or a chemical sensor (for example, an electronic nose, a health care sensor, a biometric sensor, or the like). The robot disclosed in the present disclosure may utilize pieces of information, sensed by at least two or more of these sensors, in combination. In addition, the sensing unit 240 may include a motion-related sensor 242 that detects an obstacle, a floor state, and the like.

Examples of the proximity sensor 241 may include a transmissive optical sensor, a directive reflective optical sensor, a mirror reflective optical sensor, a high-frequency emission proximity sensor, a capacitive proximity sensor, a magnetic proximity sensor, an infrared ray proximity sensor, and the like. In addition, the proximity sensor 241 may include at least one of the following: a navigation camera, an ultrasonic sensor, a lidar, or a TOF sensor. Through these sensors, the proximity sensor 241 may recognize the approach and position of a detection target (for example, a user).

The output unit 250 serves to generate an output associated with a sense of sight, a sense of hearing, a sense of touch, or the like. The output unit 250 may include at least one of the following: the touch screen 251, the sound output unit 252, or the optical output unit 253. The touch screen 251 may employ a structure layered with a touch sensor or may be integrally formed with a touch sensor. The touch screen 251 functions as a user input unit providing an input interface between the robot 200 and the user. Additionally, the touch screen 251 may provide an output interface.

The optical output unit 253 outputs a signal for notifying that an event occurs to the robot 200, using light of a light source. For example, in a case where a movement command is transferred to the motion unit 230 of the robot 200, a signal for notifying that the robot 230 is to move is output through the optical output unit 253.

The control unit 280 may include a learning data unit (not illustrated) to perform an operation associated with the robot's artificial intelligence technology. The learning data unit may be configured to receive, classify, store, and output information to be used for data mining, data analysis, intelligent decision-making, and a machine learning algorithm and for the technology. The learning data unit may include one or more memory units configured to store information received, detected, sensed, generated, and predefined through the robot or information, output in a different way through the robot, or to store data received, detected, sensed, generated and predefined by a different constituent element, device, and terminal or data, output by them.

In an embodiment, the learning data unit may be integrated with the robot and include a memory. In an embodiment, the learning data unit may be realized through the memory 270. However, the learning data unit is not limited to this memory. The learning data unit may be realized as an external memory associated with the robot 200 or through a memory included in a server capable of communicating with the robot 200. In another embodiment, the learning data unit may be realized as a memory maintained in a cloud computing environment or as a different remote memory accessible by the robot through a communication medium, such as a network.

Typically, the learning data unit is configured to store data, which are used for supervised or unsupervised learning, data mining, and forecasting analysis, or are used in a different machine learning technology, in one or more databases for the purpose of identification, indexation, classification, manipulation, storage, search, and output. Information stored in the learning data unit may be used by the control unit 280 or a plurality of control units (processors), included in the robot, which use at least one of the following different types: data analysis, a machine learning algorithm, or a machine learning technology. Examples of these algorithms and techniques include k-Nearest neighbor system, fuzzy logic (for example, possibility theory), neural networks, Boltzmann machines, vector quantization, pulsed neural nets, support vector machines, maximum margin classifiers, hill-climbing, inductive logic systems, Baysian networks, Petri nets (for example, finite state machines, Mealy machines, and Moore finite state machines), classifier trees (for example, perceptron trees, support vector trees, Markov trees, decision tree forests, and random forests), pandemonium models and systems, clustering, artificially intelligent planning, artificially intelligent forecasting, data fusion, sensor fusion, image fusion, reinforcement learning, augmented reality, pattern recognition, automated planning, and the like.

The control unit 280 may determine or forecast an operation that can be performed by the robot, on the basis of information that is determined or generated using the data analysis, the machine learning algorithm, and the machine learning technology. For this purpose, the control unit 280 may request or receive data from the learning data unit, may search the learning data unit for data, or may utilize data in the learning data unit. The control unit 280 may perform various functions that realize a knowledge-based system, an interference system, a knowledge acquirement system, and the like. Furthermore, the control unit 280 may perform various functions that realize a system (for example, a fuzzy logic system) for uncertain interference, an adaptation system, a machine learning system, an artificial neural system, and the like.

In addition, the control unit 280 may include sub-modules that enable voice and natural language processing, such as an I/O processing module, an environment condition module, a speech-to-text (STT) processing module, a natural language processing module, a task flow processing module, and a service processing module. Each of the sub-modules may have the authority to have access to one or more systems, to data and models, or to sub-sets or super sets of these in the robot. At this point, targets to which each of the sub-modules has the authority to have access may include scheduling, a vocabulary index, user data, a task flow model, a service model, and an automatic speech recognition (ASR) system.

In several embodiments, the control unit 280 may also be configured to detect and sense the user's requirement on the basis of data in the learning data unit or on the basis of a context condition or the user's intention that is expressed by user input or natural language input. When an operation of the robot is determined based on the data analysis, the machine learning algorithm, and the machine learning technology that are performed by the learning data unit, the control unit 280 may control the constituent elements of the robot to perform the determined operation. The control unit 280 may perform the determined operation by controlling the robot based on a control command.

Data for supporting various functions of the robot 200 are stored in the memory 270. A multiplicity of application programs (or applications) executed in the robot 200 and data and commands for operating the robot 200 may be stored in the memory 270. In addition, a variable vocative expression for performing a function of voice dialog with the user may be stored in the memory 270.

For example, the memory 270 may include at least one of the following storage medium types: a flash memory type, a hard disk type, a solid-state disk (SSD) type, a silicon disk drive (SDD) type, a multimedia card micro type, a card-type memory (for example, an SD or XD memory or the like), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk.

The control unit 280 normally controls the overall operation of the robot 200 in addition to the operation associated with the application program. The control unit 280 may process a signal, data, information, and the like that are input or output through the constituent elements described above, may execute an application program stored in the memory 270, or may control the motion unit 230. Thus, the control unit 280 may provide information that is suitable for the user or may perform a function that is suitable for the user.

The power supply unit 290 is supplied with external electric power and internal electric power under the control of the control unit 280 and supplies the electric power to each of the constituent elements included in the robot 200. The power supply unit 290 may include a battery. This battery may be a built-in battery or a replaceable battery.

At least several of the constituent elements may operate in cooperation to realize operation and control of the robot and a method of controlling the robot according to various embodiments described below. In addition, the operation and control of the robot and the method of controlling the robot may be realized in the robot by executing at least one application program stored in the memory 270.

When the door is closed and the door opening detection device 100 aligns, the robot 200 starts a given task. At this point, the alignment of the door opening detection device 100 refers to a state where the tag 150 is position-fixed outward from the outside of the door when the door is closed or a predetermined time thereafter and where the door sensing unit 140 is accordingly position-fixed by being pulled up.

The robot 200 may perform a given task while moving in an internal space in a state where the door is closed. The given task may be a task that requires external access restriction, for example, cleaning, sanitizing, or the like.

When the door is open, the door opening detection device 100 immediately senses movement in the direction of gravity, and thus the BT signal (an electric signal corresponding to the sensing) that notifies that the door is open is generated.

The robot 200 immediately receives from the door opening detection device 100 and recognizes the opening of the door. The robot 200 may perform an operation corresponding to the recognition of the opening of the door, for example, interruption of the given task, transmission of a notification alarm signal to a preset terminal, or searching of the surrounding environment.

In the related art, the opening of the door is detected by detecting a change in acceleration in three (x, y, and z)-axes directions of the door that occurs when the door is open, using the acceleration sensor. Accordingly, an sensing error occurs due to the features of the door (for example, the size of the door), methods of opening and closing the door, opening and closing speeds of the door, and the characteristics of the user who opens the door.

For example, a large heavy door is open at a low speed, and thus it is difficult to detect a change in acceleration while the door is open. In addition, for example, in a case where the door is open slowly due to the characteristics of the user, the acceleration may be at a value of 0. In this case, it is also difficult to detect the change in acceleration.

However, in the present disclosure, only when the door is slightly open and thus the gap occurs, the tag is no longer fixed, and the acceleration sensor senses a value of free-falling movement by a predetermined distance in the direction of gravity. Thus, without any sensing error, it is possible to precisely detect the opening of the door.

Figure 3:
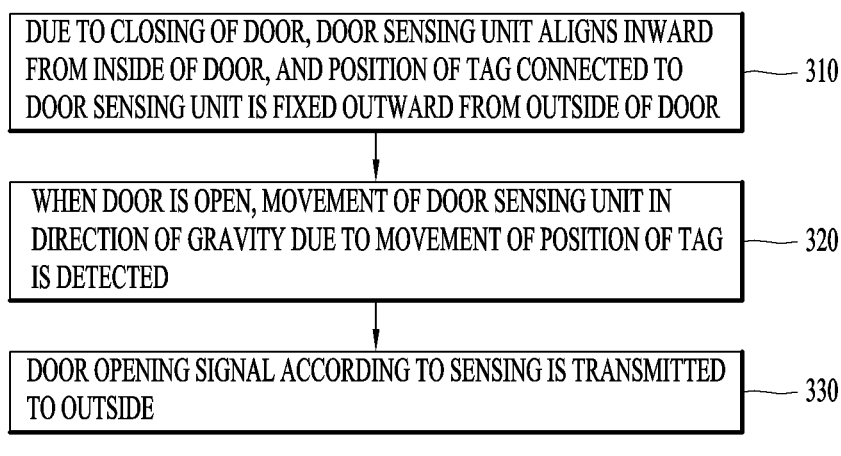
FIG. 3 is a flowchart for an operation of the door opening detection device according to the present disclosure.

FIG. 3 is a flowchart that is referenced to an operation 300 of the door opening detection device according to the present disclosure. The operation 300 illustrated in FIG. 3 is performed by the door opening detection device 100 (FIG. 1) or the door sensing unit 140 including the acceleration sensor.

With reference to FIG. 3, the operation 300 of the door opening detection device 100 (FIG. 1) according to the present disclosure starts in a state where, due to the closing of the door, the door sensing unit aligns inward from the inside of the door and the position of the tag connected to the door sensing unit is fixed outward from the outside of the door (310).

At this point, due to the closing of the door, the entrance and exit in the direction of the inside of the door are restricted, and a space where a task can be performed is secured inward from the inside of the door. The purpose (for example, internal cleaning in progress, sanitizing in progress, or no disturbance) for restricting the entrance and exit is displayed outward from the outside of the door through the tag.

In a state where the mark unit is mounted inward from the inside of the door, the door sensing unit aligns, and in a state where the tag is pulled outward from the outside of the door, the door is closed. At this point, due to the closing of the door, the gap between the door and the door frame disappears, and thus, the tag and the string connected to the tag are firmly position-fixed. Accordingly, the door sensing unit aligning inward from the inside of the door is positioned-fixed.

According to need, after the door is closed, the tag may also be further pulled outward from the outside of the door. In this case, the door sensing unit, position-fixed inward from the inside of the door, is also fixed by being pulled, in the opposite direction to gravity (that is, upward) or in the direction in which the tag is pulled, as great a distance as the tag is pulled.

In an embodiment, even in a case where the door is closed, the gap may not disappear due to the features of the door. In this case, a modification may be made to the door opening detection device in such a manner as to include a coupling means (for example, a Velcro tape or the like) outward from the outside of the door. The tag is easily attached to and detached from the coupling means.

When the door is open, the tag fixed outward from the outside of the door moves. Thus, the door opening detection device detects that the door sensing unit aligning inward from the inside of the door moves in the direction of gravity (320).

The movement of the tag is triggered by the occurrence of the gap due to the opening of the door. When the gap occurs, due to a difference in weight between the door sensing unit, including the acceleration sensor, and the tag, the tag and the string connected to the tag are pulled inward from the inside of the door, and the door sensing unit falls from the mark unit in the direction of gravity. This movement is always sensed by a change in acceleration in the z direction. Therefore, the opening of the door is precisely detected regardless of the features of the door, the methods of opening and closing the door, or the opening and closing speeds of the door.

Next, a door opening signal according to the detection of the movement of the door sensing unit in the direction of gravity is transmitted to the outside (330). This transmission refers to the emission of an electric signal that results from converting movement in the direction of gravity, which is sensed by the door sensing unit.

In the present disclosure, the robot or the like that currently performs a task in the space inward from the inside of the door may receive the door opening signal. In response to the reception of the door opening signal, the robot or the like may perform a corresponding operation (for example, task interruption or notification to an external terminal).

Installation of the door opening detection device and a process in which the door opening detection device operates when closing and opening the door are in detail below with reference to FIGS. 4A to 4F.

Figure 4A:
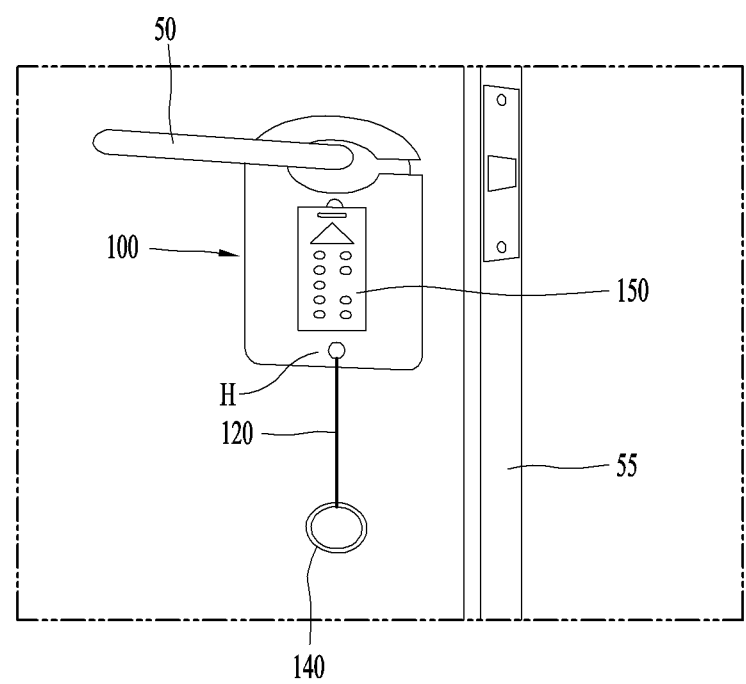
FIGS. 4A to 4F are conceptual diagrams that are referenced to describe in detail a process in which the door opening detection device according to the present disclosure operates when a door is closed and when the door is open.

As illustrated in FIG. 4A, the door opening detection device 100 may be mounted to a handle 50 of the door, which is positioned inward from the inside of the door toward the space, the entrance and exit to and from which are restricted.

At this point, as opposed to FIG. 1, the tag 150 (FIG. 1) of the door opening detection device 100 may be connected to the other end portion of the connection unit 120 so that the tag 150 aligns in a manner that overlaps a front surface of the mark unit 110 (FIG. 1). That is, during initial aliment, the tag 150 may be arranged on the front surface of the mark unit 110 along the direction in which the connection unit 120 passes through a hole H (FIG. 4A) or may also be arranged on a rear surface of the mark unit 110 (FIG. 1).

The door sensing unit 140 of the door opening detection device 100 is connected to the tag 150 through the connection unit 120 (FIG. 1). The door sensing unit 140 is coupled in the downward direction in a state where the connection unit 120 sequentially passes through a plurality of holes H drilled in the upward-downward direction in the front surface of the mark unit 110. With this structure, even in a case where the door sensing unit 140 is pulled upward or falls downward, the mark unit 110 is kept aligning without any twist, and the string of the connection unit 120 is also not twisted.

The connection unit 120 performs a function of linking the movement of the door sensing unit 140. Specifically, one end portion of the connection unit 120 is connected to the door sensing unit 140, and the other end portion thereof is connected to the tag 150. Consequently, the movement is linked in such a manner that, along the direction in which one of the following: the door sensing unit 140 and the tag 150 is pulled, the other one moves. For this purpose, the connection unit 120 is made from a string, suitable to link the movement, such as a code, a wire, or a strap.

A door lateral surface 55 is positioned between the inside and the outside of the door. When the door is open, at least one portion of the door lateral surface 55 is exposed, and thus the gap occurs. When the door is closed, the door lateral surface 55 is hidden from view, and the gap disappears.

Figure 4B:
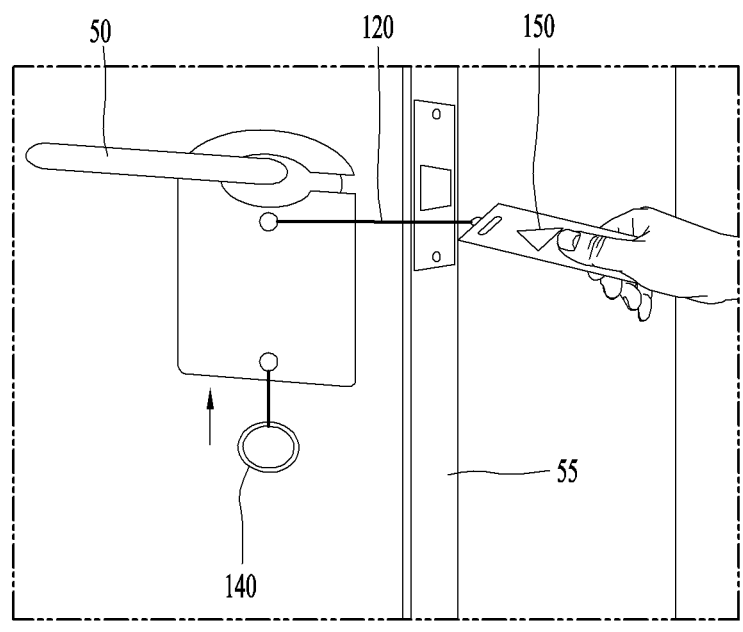
Figure 4C:
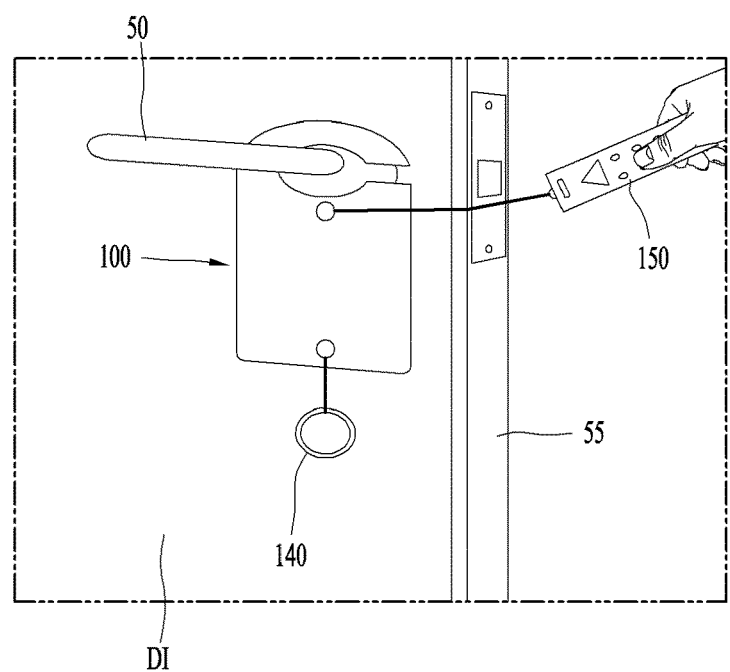

In a state where in this manner, the door opening detection device 100 is mounted to the handle 50 on the inside DI of the door, the tag 150, as illustrated in FIGS. 4B and 4C, is pulled outward from the outside of the door by being gripped. When this is done, a pulling force is applied, as is, to the door sensing unit 140 through the connection unit 120, and the door sensing unit 140 is pulled up in the opposite direction to gravity (that is, upward). At this point, the user who wants to restrict the entrance and exit through the door moves from the inside DI of the door to the outside DO or moves outward from the outside DO and then pulls the tag.

Figure 4D:
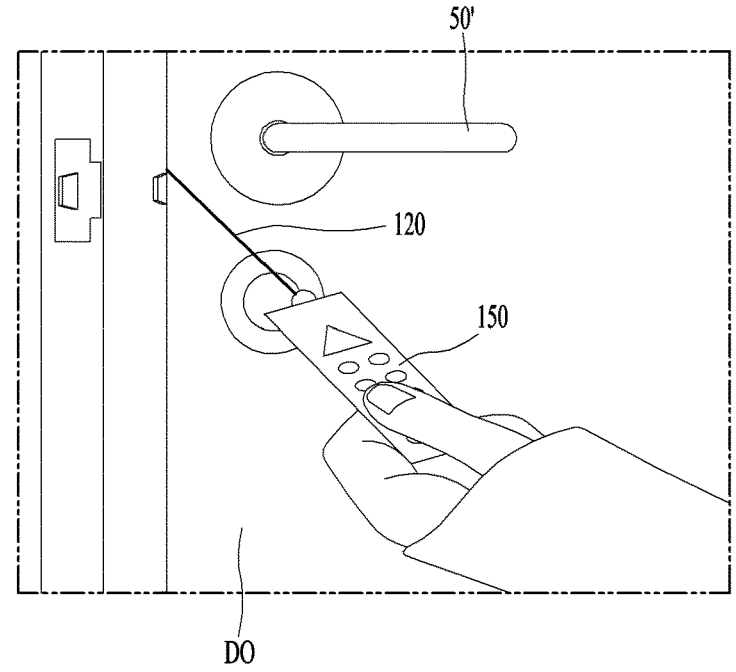

While the tag 150 is kept gripped, as illustrated in FIG. 4D, the tag 150 is further pulled in such a manner as to be exposed outward from the outside DO of the door. A sign indicating the purpose (for example, cleaning in progress, sanitizing in progress, task performance in progress, no disturbance, or the like) for restricting the entrance and exit may be included in the exposed tag 150.

Figure 4E:
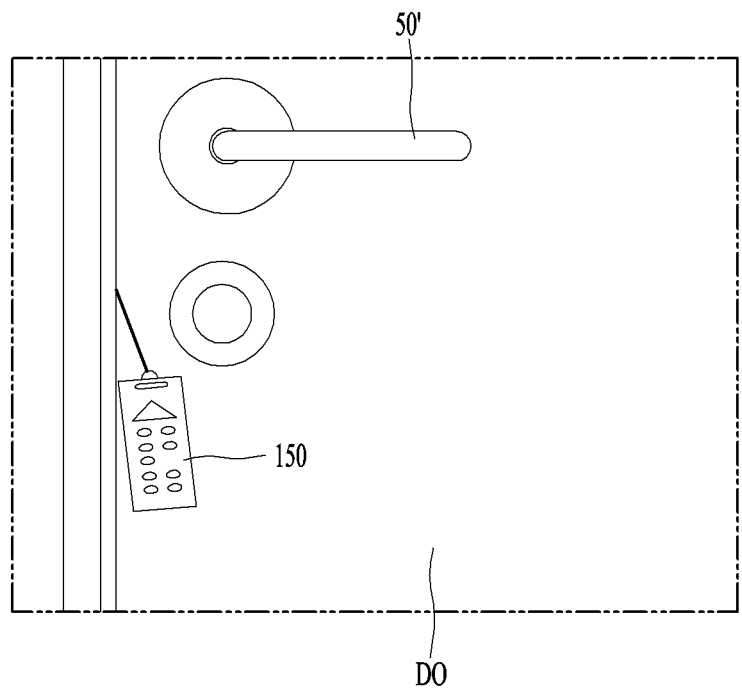

When the door is fully closed, as illustrated in FIG. 4E, the gap between the door and the door frame is hidden from view, and the connection unit inserted into the gap is fixed, and thus, the tag 150 coupled to the other end portion of the connection unit is position-fixed outward from the outside DO of the door. This state means that the initial mounting of the door opening detection device 100 is completed.

Accordingly, the purpose for restricting the entrance and exit through the door is displayed outward from the outside of the door, and a state where the opening of the door can be immediately sensed from inward from the inside of the door is attained.

Figure 4F:
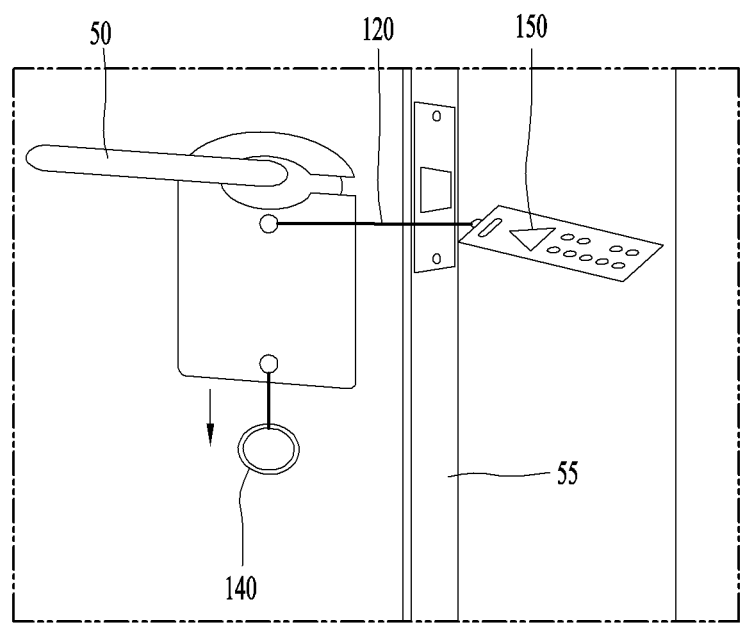

When the door is open after the initial mounting is completed, as illustrated in FIG. 4F, the gap occurs and the connection unit inserted into the gap is no longer fixed. Accordingly, the position of the tag 150 moves along the connection unit. A distance that the tag 150 moves corresponds to a distance that the connection unit moves while inserted into the gap.

Due to the difference in weight between the door sensing unit 140, coupled to one end portion of the connection unit 120, and the tag 150, the tag 150 is pulled, in a swallowed manner, inward from the inside of the door, more specifically, toward the hole in the mark unit 110 mounted inward from the inside of the door. At the same time, the door sensing unit 140 falls. This movement is always sensed into a value of a change in acceleration in the z-axis. Because of this, the door sensing unit 140 may sense the movement in the direction of gravity immediately after the door is open, and may convert the sensed movement into an electric signal.

For convenience of description, the description is provided above, taking an example where a single door is open and closed in a hinged manner. However, the door opening detection device according to the present disclosure may find application in any types of doors and methods of opening and closing the door. For example, in the case of a double door, the tag may be initially mounted in a position-fixed manner after passing through a gap between two separate panels of the double door.

Figure 5:
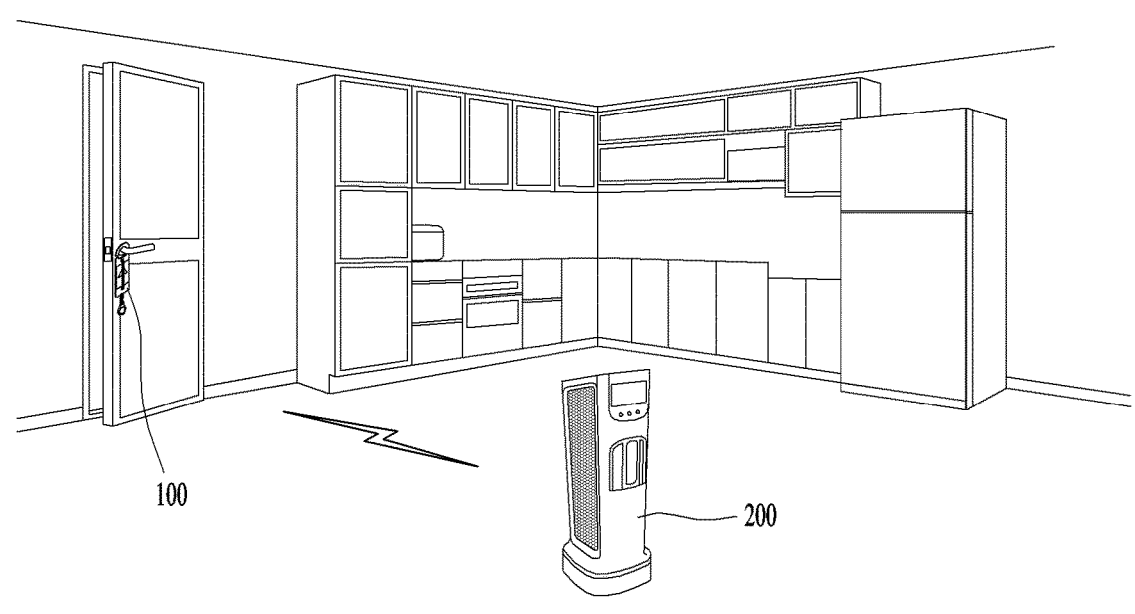
FIG. 5 is a view that is referenced to describe a door opening recognition system according to the present disclosure.

FIG. 5 is a view that is referenced to describe the door opening recognition system according to the present disclosure.

With reference to FIG. 5, as described above with reference to FIGS. 4A to 4E, in a state where the initial mounting of the door opening detection device 100 according to the present disclosure is completed, a given task may be performed by the robot 200 in an internal space inward from the inside of the door.

For this purpose, the robot 200 may be programmed in such a manner that, when a command for starting a given task is input into the robot 200 before the door opening detection device 100 is initially mounted, the robot 200 starts the given task after counting up a preparation time (for example, 30 seconds or shorter) for performing the initial mounting described with reference to FIGS. 4A to 4E.

While the robot 200 performs the given task in the internal space, when the door opens, the door opening detection device 100 mounted to the handle immediately detects movement in the direction of gravity and transmits an electricity signal. The electric signal, as described above, may be in the form of a BT signal.

In response to the reception of a door opening detection signal in the form of a BT signal from the door opening detection device 100, the robot 200 may interrupt the task. Subsequently, the robot 200 transmits a door opening notification event through a control application of a given user terminal and thereafter may maintain a waiting state for receiving a user command.

Figure 6:
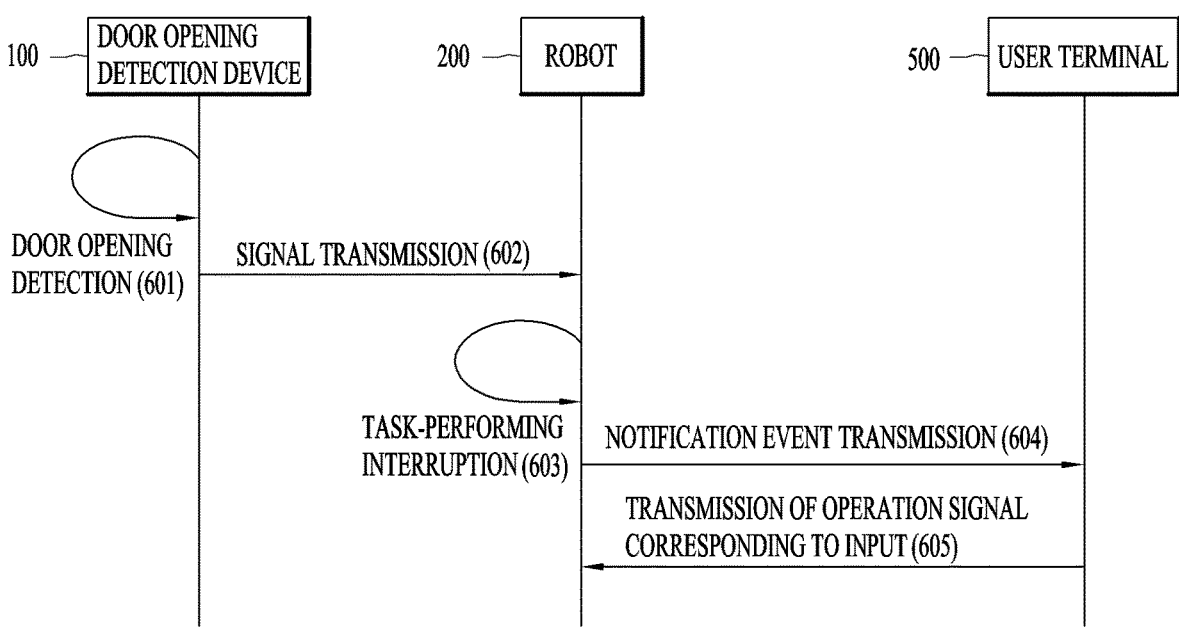
FIG. 6 is an operational flowchart associated with FIG. 5.

FIG. 6 is an operational flowchart associated with FIG. 5.

With reference to FIG. 6, the door opening detection device 100 performs a sensing operation in a state where the mark unit and the door sensing unit align in a mounted manner inward from the inside of the door and where the tag is position-fixed by being exposed outward from the outside of the door. When the door is open, the door opening detection device 100 senses falling movement of the door sensing unit in the direction of gravity while the position of the door sensing unit moves into the gap between the door and the door frame. Consequently, the door opening detection device 100 detects the opening of the door (601).

The door opening detection device 100 transmits a signal, corresponding to the detection of the opening of the door, to the robot 200 that currently performs a task in the internal space inward from the inside of the door (602).

More specifically, the door opening detection device 100 generates a door opening detection signal corresponding to the sensing, using a value of the movement in the direction of gravity. Then, when the door opening detection device 100 transmits the door opening detection signal, the robot 200 receives a corresponding BT signal through the communication module. The robot 200 may include a BT communication module to receive a detection signal that is transmitted in compliance with a BT communication scheme. In this manner, the detection signal is directly transferred in compliance with the BT communication scheme. Therefore, as described in detail below, it is possible to immediately deal with the door opening detection signal. Consequently, there is no concern about areas where communication is not available.

According to an embodiment, the door opening detection device 100 and the robot 200 may transfer and receive the detection signal using other short-distance communication technologies, such as RFID, ZigBee, UWB, and Infrared Ray communication, or using wireless Internet communication technologies, such as WLAN, Wi-Fi, Li-Fri, Direct, DLNA, WiBro, LTE, and LET-A, according to need.

In response to the received BT signal, the robot 200 interrupts the task in progress (603). For example, when receiving the BIT signal, the robot 200, which performs a cleaning task or a sanitizing task in the internal space inward from the inside of the door, may immediately stop traveling and may interrupt a given operation for the cleaning task, the sanitizing task, or the like.

At the same time or within a predetermined time, the robot 200 may transmit a notification event, indicating that the door is open, to a user terminal 500 that is given in advance (604). For this purpose, the user terminal 500 establishes a connection with the robot 200 in such a manner as to be provided with a situation event through a preset application while the robot 200 performs a task.

At this point, the door opening notification event may be transmitted in compliance with a communication scheme different from the above-described BT communication scheme. The door opening notification event may further include additional information, such as identification information (for example, ID) of the robot 200, positional information, and the time when a door opening signal is received, along with a signal indicating the opening of the door.

In response to the reception of the door opening notification event, the user terminal 500 outputs a corresponding alarm. At this point, when a control command based on an input from the user terminal 500 is generated, the user terminal 500 transmits an operation signal, corresponding to the corresponding input, the robot 200 (605). Then, the robot 200 may perform a corresponding operation corresponding to the received operation signal.

In an embodiment, the corresponding operation may include a traveling operation and an image-capturing operation for the robot 200 to search the vicinity of the door and recognize a person adjacent to the door. In addition, the corresponding operation may further include an operation of outputting a notification message to the found person. In addition, the corresponding operation may further include an operation of transmitting a result of the searching to the user terminal 500.

As described above, the door opening detection device and the door opening recognition system according to the embodiment of the present disclosure possibly find application in various shapes of doors and methods of opening and closing doors and can detect an open state of a door in a fast and precise manner regardless of an opening speed of the door. In addition, the door opening detection device and the door opening recognition system do not need to be installed in a separate manner, and can be easily moved and mounted in accordance with a change in a location where a task is to be performed. In addition, various purposes for restricting entrance and exit can be displayed for viewing from the outside. This prevents arbitrary removal by burglars, thereby addressing the difficulty in sensing. In addition, sensing is performed at the same time as the door is open. This allows the robot or the like, which currently performs a task inward from the inside of the door, to be immediately notified that the door is open. Accordingly, there can be provided an advantage in that the robot or the like that currently performs a task takes prompt action.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

Features, structures, effects, and the like described in those embodiments are included in at least one embodiment of the present disclosure, and are not necessarily limited to only one embodiment. Furthermore, features, structures, effects, and the like illustrated in each embodiment may be combined or modified with respect to other embodiments by those skilled in the art to which the embodiments belong. Therefore, contents related to such combinations and modifications should be construed as being included in the scope of the present disclosure.

In addition, the foregoing description has been made with reference to the embodiments, but it is merely illustrative and is not intended to limit the present disclosure. It will be apparent that other changes and applications can be made by those skilled in the art to which the present disclosure belong without departing from substantial features of the embodiments of the present disclosure. For example, each component specifically shown in the embodiments can be modified and practiced. And it should be construed that differences relating to such changes and applications are included in the scope of the present disclosure defined in the appended claims.

The invention claimed is:

1. A door opening detection device comprising:
a mark unit having a first portion and a second portion, the first portion being formed in such a manner as to be mountable on a handle of a door, the second portion extending from the first portion, and at least one hole being formed in the second portion;
a connection unit configured in the shape of a string, the connection unit passing through the hole in the mark unit, and both ends of the string being arranged to face in the direction of gravity;
a door sensing unit connected to one end portion of the connection unit and configured to sense a value of movement in the direction of gravity when the door is open; and
a tag connected to the other portion of the connection unit, the tag and the door sensing unit being connected to each other through the connection unit,
wherein the door sensing unit aligns inward from the inside of the door, together with the mark unit, when the door is closed, detects the movement in the direction of gravity according to movement of a position of the tag that results when the door is open, in a state where the tag is fixed in such a manner as to be positioned outward from the outside of the door, and outputs a signal that results from detecting the opening of the door.

2. The door opening detection device of claim 1, wherein the tag is formed in a thin long shape in such a manner that a sign thereof is exposed outward from the outside of the door while the door is closed and that the movement of the position thereof is possible due to a gap that occurs when the door is open.

3. The door opening detection device of claim 2, wherein the door sensing unit, connected to one end portion of the connection unit, detects a value of falling movement in the direction of gravity that is as great a distance as the position of the tag, connected to the other end portion of the connection unit, moves toward the hole along the gap when the door is open.

4. The door opening detection device of claim 1, wherein at least a plurality of holes are arranged to be spaced a predetermined separation distance apart in parallel in the upward-downward direction, in the second portion of the mark unit.

5. The door opening detection device of claim 4, wherein one end portion of the connection unit is connected to the door sensing unit in a state of sequentially passing through the plurality of holes in the direction from upward to downward, and the other end portion of the connection unit is connected to the tag in a state of passing through only one of the plurality of holes.

6. The door opening detection device of claim 1, wherein the string of the connection is configured to have a structure with at least two cords, and the thickness of the string has a lower value than the radius of the hole.

7. The door opening detection device of claim 1, wherein the door sensing unit, connected to one end portion of the connection unit, is pulled in the opposite direction to gravity as great a distance as the tag, connected to the other end portion of the connection unit, is pulled, the position of the tag and a position of the door sensing unit are fixed by the closing of the door, and the fixed position of the door sensing unit is set as a reference position for detecting the movement in the direction of gravity.

8. The door opening detection device of claim 7, wherein the movement of the door sensing unit is on the basis of the movement of the tag connected through the connection unit, and, when the door is open, the door sensing unit detects a value of falling movement in the direction of gravity from the set reference position on the basis of the movement of the tag, which results from being no longer fixed, and generates a signal corresponding to the detected movement.

9. The door opening detection device of claim 8, wherein the generated signal is transmitted to an external device that is present within a short-range communication range.

\* \* \* \* \*